United States Patent Office 3,549,209
Patented Dec. 22, 1970

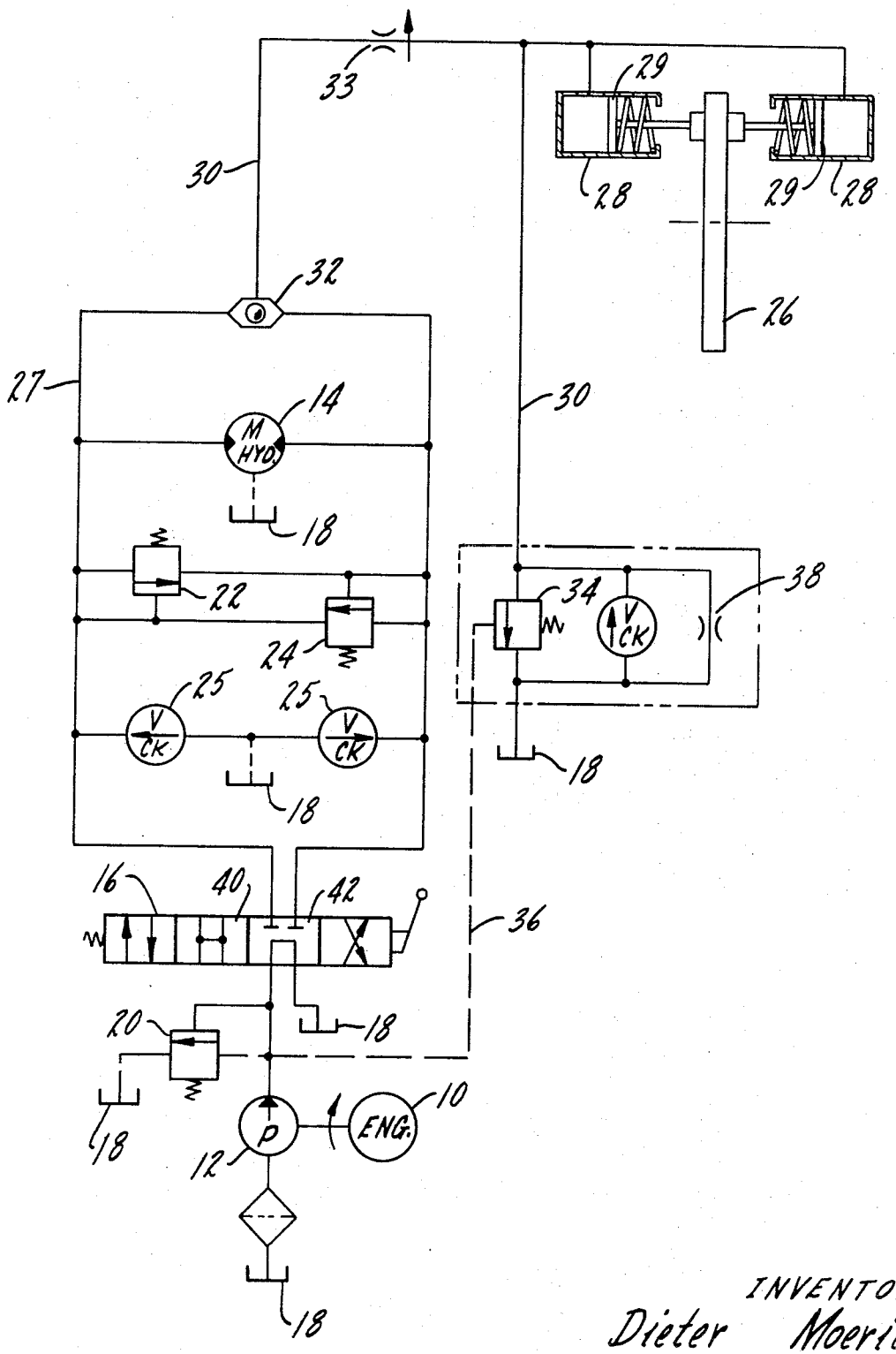

3,549,209
HYDRAULIC BRAKING SYSTEM
Dieter Moericke, Milwaukee, Wis., assignor to Nordberg Manufacturing Company, Milwaukee, Wis., a corporation of Wisconsin
Filed Feb. 14, 1969, Ser. No. 799,225
Int. Cl. B60t 13/22, 7/12
U.S. Cl. 303—21        5 Claims

ABSTRACT OF THE DISCLOSURE

A hydraulic braking system particularly suited for hydraulically driven wheeled vehicles of the railway track type having a pump connected to the vehicle to be driven thereby, a brake cylinder for braking the wheeled vehicle and a valve to control the hydraulic pressure applied to the brake cylinder, the valve being responsive to deceleration conditions on the vehicle such that the brake cylinder will be pressurized under deceleration and will not be pressurized when the vehicle is under propulsion. In addition a controlled bleed means communicates with the brake cylinder to relieve the cylinder of excessive pressure such that during deceleration the controlled bleed means will prevent the brake cylinder from locking the wheels and skidding the vehicle.

SUMMARY OF THE INVENTION

This invention relates to apparatus particularly suited for application with hydraulically driven machines or mechanisms and more particularly, to a hydraulic braking system for a wheeled vehicle.

Accordingly, a primary object of this invention is a novel braking system having a pump with improved means for regulating the flow of hydraulic fluid to provide a safer stopping means for wheeled vehicles.

A further object is a hydraulic braking system that develops the highest possible braking torque without totally locking the wheels through use of novel valving arrangement.

Another object is a braking system wherein the braking is done through a brake cylinder which prevents the brakes from locking and the wheels from skidding.

Another object is an improved braking system which prevents the hydraulic circuit from overloading and prevents the development of flat spots on the vehicle wheels.

Another object is a versatile braking system which can be used on any wheeled vehicle having a hydraulic drive and is particularly suited for railway track work.

Another object is a braking system which can be assembled from standard, commercially available components and does not require any special or unusual parts.

Other objects and advantages will be apparent from the following specification, claims and drawings for this invention.

BRIEF DESCRIPTION OF THE DRAWING

The invention is illustrated by the accompanying drawing wherein the figure is a diagrammatic view of the hydraulic braking system for a wheeled vehicle.

DESCRIPTION OF THE PREFERRED EMBODIMENT

In the drawing a small gasoline engine is indicated at 10 for driving a hydraulic pump 12 or the like. Suitable hydraulic connections or lines deliver high pressure fluid from the pump 12 to the hydraulic motor 14. It will be understood that the motor 14 is suitably coupled, through a direct drive or similar means to a drive shaft or wheels of the vehicle.

A directional control valve 16 of the standard type can be moved either one way or the other so that the hydraulic motor 14 will rotate in either direction for either forward or reverse operation. In the drawing, the directional control valve 16 is shown in a neutral or braking position 42 so that pressure from the pump 12 goes to a sump 18. The position 40 is a coasting position in which the hydraulic fluid will merely circulate around the main circuit 27 through the motor 14 and the brakes will not be applied.

A suitable relief valve 20 may be connected to the discharge from the pump 12 for relieving excessive pressures to the sump 18 due to overload conditions. Suitable relief valves may also be provided across the system or circuit, as at 22 and 24 for the same purpose.

Back-to-back check valves 25 connected to the sump 18 provide a supply of hydraulic fluid for the system when it is operating under deceleration condition, as for example, during braking, when the motor 14 will act as a pump.

Suitable disc brakes 26 may be operated by brake cylinders 28 and pistons 29 which are schematically shown and can be any conventional commercial type. A hydraulic line 30 connected into the main circuit 27 through a shuttle valve 32 feeds fluid pressure to the disc brakes 26.

A valving arrangement such as a pressure compensated flow control valve 33 is provided in line 30 and is in the nature of an adjustable orifice to allow any set flow of fluid to the disc brakes 26. For example, in one form of the invention .3 gallon per minute flow through the control valve 33 has been found satisfactory.

A discharge connection allowing a controlled bleed of pressure from the disc brakes 26 is operated by an unloading valve 34 and is connected by a line 36 to the pump output. When the pump 12 is operating and is supplying fluid under pressure to the system, line 36 will be pressurized which will open the unloading valve 34 thereby allowing any fluid in the line 30 to go to the sump 18 rather than pressurizing the disc brakes 26.

The controlled bleed of pressure from the disc brakes 26 has been indicated at 38 for purposes of illustration and it should be realized that the unloading valve 34 does not have a separate and distinct orifice for this purpose. The orifice shown at 38 indicates that a controlled bleed or leakage in the unloading valve 34 is desired and, in fact, quite important for the successful operation of the hydraulic braking system. This invention thus takes advantage of what is normally considered a disadvantage in valves of this general type.

The use, operation and function of this invention are as follows.

This invention is particularly applicable to railroad track maintenance equipment. For example, it has been found to be particularly suitable for use on railroad tie handlers of the type shown in copending application Ser. No. 786,842, filed Dec. 19, 1968. This is merely given by way of example and it should be understood that this invention can be used for controlling the braking of any wheeled vehicle.

During normal operation when the vehicle is moving down the road or track, the propulsion unit shown in this application as a gasoline engine 10, driving a pump 12, supplies pressure fluid to the motor 14. The directional control valve 16 will be positioned so that the motor 14 is driven in either forward or reverse direction.

When the operator ceases the propulsion of the vehicle, for example, when he takes his foot off the gas, the vehicle goes into what is characterized as deceleration conditions. This includes inertia or braking situations. Since the motor 14 is connected either directly or indirectly, to the wheels, the inertia of the vehicle will drive the motor 14 which then may become a pump. In other words the motor 14 operates as a motor when under propulsion and as a pump when under deceleration conditions.

Under deceleration conditions the directional control valve 16 will be in a neutral position. The shuttle valve 32 will be to one side or the other depending upon which way the motor 14 is turning. This will block any return of hydraulic fluid and all fluid discharged by the motor 14 acting as a pump will go through line 30. Through the pilot connection 36 the unloading valve moves to a closed position which prevents the pressure fluid from going directly into the sump 18 and in turn pressurizes the brake cylinders 28.

The unloading valve 34 has an inherent amount of leakage which may be characterized as a controlled bleed. As the motor 14 builds up pressure in the brake cylinders 28, they will tend to lock and cause the vehicle to skid. In this invention skidding will not occur because the controlled bleed or leakage through the unloading valve will always reduce the pressure just before the brakes lock.

It should be remembered that the turning of the wheels causes the motor 14 to act as a pump. Therefore, if the brakes lock and the wheels stop turning, the motor 14 now acting as a pump will stop operating at a certain high pressure level. Automatically the controlled bleed or leakage through the unloading valve will reduce the pressure and the brake cylinders 28 will unlock. Stated in another way, the pressure build-up in the brake cylinders 28 approaches but cannot reach a locked or stalled condition since the controlled bleed or leakage will prevent the brakes from grabbing or locking.

It will be understood that suitable additions, modifications, changes, substitutions or alterations may be made without departing from the fundamental theme of the invention.

I claim:

1. In a hydraulic braking system for a wheeled vehicle, a pump connected to the vehicle to be driven thereby, a brake cylinder connected to a pump for braking the wheeled vehicle, a valve connected to the brake cylinder to control the hydraulic pressure applied to the brake cylinder, a connection making the valve automatically responsive to propulsion conditions on the vehicle such that the brake cylinder cannot be pressurized when the vehicle is under propulsion but can be when the vehicle is under deceleration and a controlled bleed communicating with the brake cylinder to relieve the cylinder of excessive pressure such that during deceleration the controlled bleed will prevent the brake cylinder from locking the wheels and skidding the vehicle.

2. The structure of claim 1 further characterized by and including a controlling orifice between the pump and the brake cylinder reducing the flow of hydraulic fluid to the brake cylinder under all conditions, an unloading valve communicating with the discharge from the orifice and responsive to the output pressure from the pump so that the unloading valve is open when the pump is propelling the vehicle and is closed during deceleration, the control bleed being in the unloading valve so that when the vehicle is under deceleration conditions the controlled bleed will prevent the brake cylinder from locking the wheels.

3. The structure of claim 1 further characterized in that the controlled bleed includes an unloading valve connected to the brake cylinder and responsive to the discharge pressure from the pump such that the unloading valve is open when the pump is propelling the vehicle and closed when the vehicle is operating under deceleration conditions.

4. The structure of claim 1 further characterized in that the pump is driven by a prime mover and is connected to drive a motor which in turn drives the wheeled vehicle.

5. In a hydraulic propulsion and braking system for a wheeled vehicle, a prime mover, a pump connected to the prime mover to be driven by it, a motor connected to the pump so as to be driven thereby and connected to the wheels of the vehicle to propel it, a brake cylinder connected to the motor to receive hydraulic fluid from the motor when the vehicle is under deceleration conditions and the motor is acting as a pump by inertia, a valve connected to the brake cylinder to control the hydraulic pressure applied to the brake cylinder, a connection to the valve responsive to the operating condition of the vehicle such that the brake cylinder will be pressurized under deceleration and will not be pressurized when the vehicle is under propulsion, and a controlled bleed communicating with the brake cylinder to relieve the cylinder of excessive pressure such that during acceleration the controlled bleed will prevent the brake cylinder from locking the wheels and skidding the vehicle.

References Cited

UNITED STATES PATENTS

| | | | |
|---|---|---|---|
| 2,869,687 | 1/1959 | Keim et al. | 303—210X |
| 3,004,801 | 10/1961 | Wrigley | 303—210X |
| 3,124,220 | 3/1964 | Kell | 303—21X |
| 3,458,053 | 7/1969 | Reuter | 60—53X |

TRYGVE M. BLIX, Primary Examiner

J. J. McLAUGHLIN, JR., Assistant Examiner

U.S. Cl. X.R.

60—53; 188—140, 181; 303—10, 19, 24